United States Patent
Kraus et al.

(10) Patent No.: US 6,402,814 B1
(45) Date of Patent: Jun. 11, 2002

(54) PROCESS FOR THE TREATMENT OF A GAS BY TEMPERATURE SWING ADSORPTION

(75) Inventors: Georges Kraus, Paris; Patrick Le Bot, Vincennes; Lian-Ming Sun, Villebon-sur-Yvette, all of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 8 days.

(21) Appl. No.: 09/679,611

(22) Filed: Oct. 5, 2000

(30) Foreign Application Priority Data

Oct. 8, 1999 (FR) .............................. 99 12577

(51) Int. Cl.[7] .............................................. B01D 53/04
(52) U.S. Cl. .............................. 95/106; 95/104; 95/115; 95/120; 95/129; 95/139
(58) Field of Search .............................. 95/99, 106, 114, 95/115, 117, 120, 123, 129, 139

(56) References Cited

U.S. PATENT DOCUMENTS

| | | | |
|---|---|---|---|
| 3,928,004 A | * 12/1975 | Bligh et al. | 95/114 |
| 3,973,931 A | * 8/1976 | Collins | 95/99 |
| 4,026,680 A | * 5/1977 | Collins | 95/99 |
| 4,324,564 A | * 4/1982 | Oliker | 95/123 X |
| 4,324,566 A | * 4/1982 | Jacob et al. | 95/115 |
| 4,329,158 A | * 5/1982 | Sircar | 95/99 X |
| 4,373,935 A | * 2/1983 | Ausikaitis et al. | 95/123 |
| 4,472,178 A | 9/1984 | Kumar et al. | 55/25 |
| 4,770,676 A | * 9/1988 | Sircar et al. | 95/99 |
| 5,137,548 A | * 8/1992 | Grenier et al. | 95/123 X |
| 5,417,742 A | * 5/1995 | Tamhankar et al. | 95/99 X |
| 5,520,721 A | * 5/1996 | Fraysse et al. | 95/114 |
| 5,542,965 A | 8/1996 | Straubinger et al. | 95/14 |
| 5,766,311 A | * 6/1998 | Ackley et al. | 95/126 X |
| 5,779,767 A | 7/1998 | Golden et al. | 95/96 |
| 5,855,650 A | * 1/1999 | Kalbassi et al. | 95/115 X |
| 5,906,675 A | * 5/1999 | Jain et al. | 95/99 |
| 5,914,455 A | * 6/1999 | Jain et al. | 95/106 X |
| 5,925,322 A | 7/1999 | Werth | 422/170 |
| 5,938,816 A | * 8/1999 | Harle et al. | 95/106 X |
| 5,958,109 A | * 9/1999 | Fuderer | 95/106 X |
| 5,989,314 A | * 11/1999 | Schaub et al. | 95/139 X |
| 6,106,593 A | * 8/2000 | Golden et al. | 95/120 |
| 6,270,557 B1 | * 8/2001 | Millet et al. | 95/120 X |
| 6,273,939 B1 | * 8/2001 | Millet et al. | 95/106 |

FOREIGN PATENT DOCUMENTS

| | | |
|---|---|---|
| DE | 19534008 A1 | 3/1997 |
| EP | 0 438 282 A1 | 7/1991 |
| EP | 0862937 A2 | 9/1998 |

* cited by examiner

*Primary Examiner*—Robert H. Spitzer
(74) *Attorney, Agent, or Firm*—Young & Thompson

(57) ABSTRACT

The regeneration phase of the adsorption cycle includes a depressurization step, a heating/elution step, during which the bed is purged with a hot heating/elution gas, and a cooling/elution step, during which the bed is purged with a cold cooling/elution gas. The cooling/elution step is terminated while the cooling/elution gas leaving the bed is at a temperature markedly higher than the temperature of the gas to be treated and the adsorption phase comprises an initial adsorption step during which the bed is cooled down to the low adsorption temperature due to the effect of the gas to be treated.

8 Claims, 4 Drawing Sheets

PROCESS FOR THE TREATMENT OF A GAS BY TEMPERATURE SWING ADSORPTION

BACKGROUND OF THE INVENTION

The present invention relates to a process for the treatment of a gas by Temperature Swing Adsorption (TSA), of the type in which each bed of adsorbent is subjected to a cycle which comprises, in succession: an adsorption phase which itself comprises an adsorption step at a low adsorption temperature; an adsorbent regeneration phase which itself comprises a depressurization step; a heating/elution step, during which the bed is purged with a hot heating/elution gas, and a cooling/elution step, during which the bed is purged with a cold cooling/elution gas; and a repressurization phase.

The invention applies in particular to the purification of atmospheric air intended to be distilled, especially by stripping out the water and the carbon dioxide.

The adsorbents used may be activated alumina, doped alumina, zeolites (A, X, LSX, etc.), silica gel or a succession of several of these products.

Adsorption of $CO_2$, water and other impurities is promoted by low temperatures. It is therefore important for the adsorption to be carried out at low temperature and, consequently, the operation universally adopted involves cooling the entire adsorbent down to approximately the low adsorption temperature, which is close to the temperature of the gas to be treated, before starting the next adsorption phase. This way of carrying out the process also has the advantage, in the case of a cryogenic plant located downstream, of minimizing the heat flux sent into this plant when the bed is switched to the adsorption phase.

SUMMARY OF THE INVENTION

The object of the invention is to make it possible to reduce the investment and/or to increase the productivity of the plant located downstream, while maintaining satisfactory adsorption performance.

For this purpose, the subject of the invention is a treatment process of the aforementioned type, characterized in that the cooling/elution step is terminated while the cooling/elution gas leaving the bed is at a markedly higher temperature than the temperature of the gas to be treated and in that the adsorption phase comprises an initial adsorption step during which the bed is cooled down to the low adsorption temperature due to the effect of the gas to be treated.

The process according to the invention may include one or more of the following characteristics:

- the cooling/elution step is terminated when the cooling/elution gas leaving the bed is at a temperature at least 30° C. greater, preferably at least 50° C. greater, than the temperature of the gas to be treated;
- during at least a first part of the initial adsorption step, the bed is connected up in parallel with another bed at the end of the adsorption phase and the two gas streams coming from these two beds are combined.

BRIEF DESCRIPTION OF THE DRAWINGS

Embodiments of the invention will now be described with regard to the appended drawings, in which.

DETAILED DESCRIPTION OF THE INVENTION

The pressures indicated below are absolute pressures.

Figure 1:
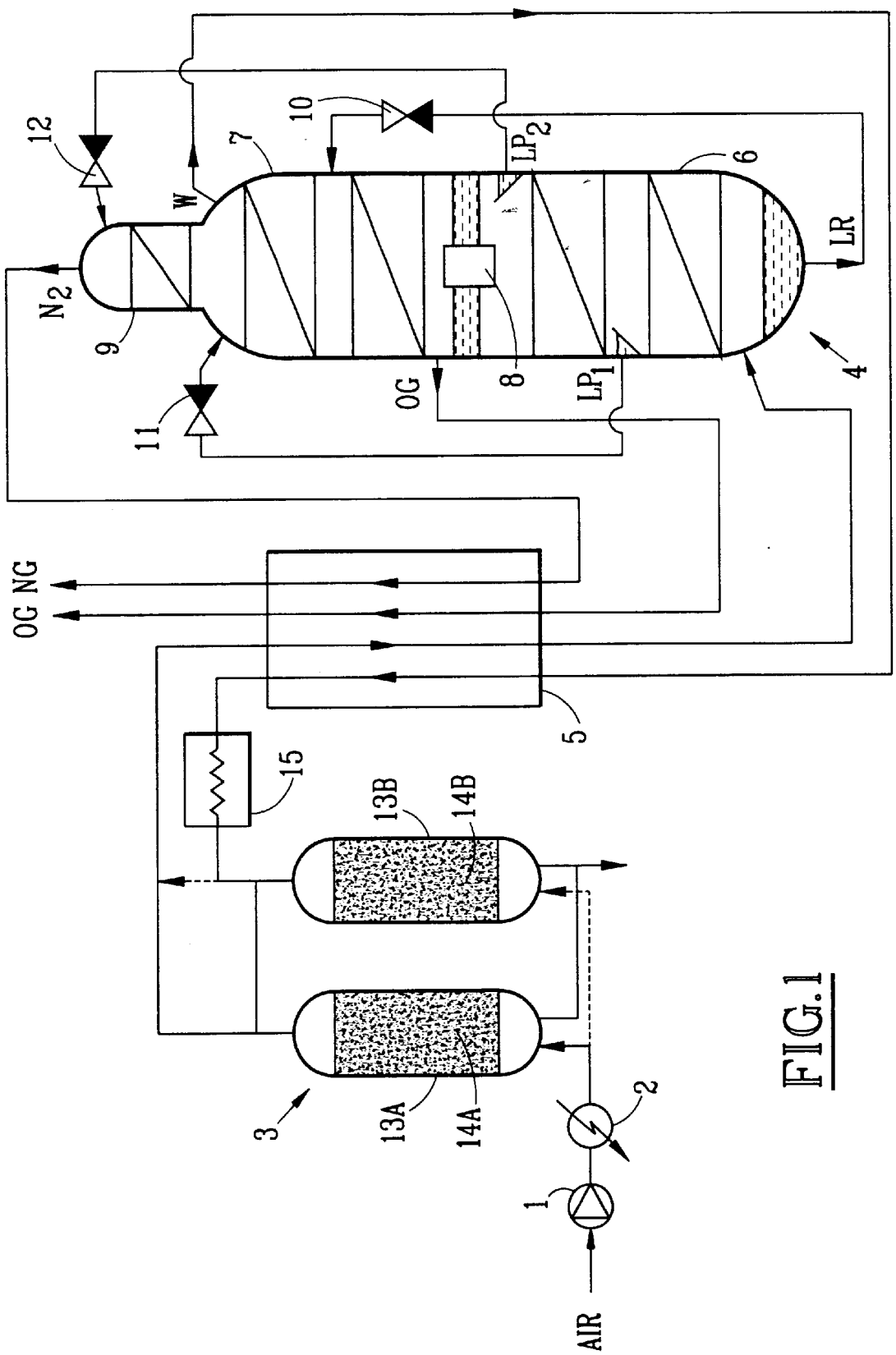
FIG. 1 shows schematically an air distillation plant to which the process of the invention is applied.

Shown schematically in FIG. 1 is a plant for producing gaseous oxygen and gaseous nitrogen at low pressure by the distillation of atmospheric air. This plant comprises essentially an air compressor 1 equipped at its output with an air or water chiller 2, an apparatus 3 for purifying the compressed air, especially by stripping out the water and $CO_2$, a double distillation column 4 and a heat exchange line 5 intended to cool the purified air by indirect heat exchange with the cold gas streams coming from the double column 4.

The double column 4 essentially comprises a medium-pressure lower column 6 surmounted by a low-pressure column 7. A reboiler/condenser 8 brings the vapour (almost pure nitrogen) from the top of the column 6 into heat-exchange relationship with the liquid (almost pure oxygen) from the bottom of the column 7. The latter is surmounted by a section of smaller diameter or "minaret" 9 with which its top communicates freely.

In operation, the air to be treated, compressed at 1 to a medium pressure MP of about 5 to 6 bar, precooled at 2, purified at 3 and cooled at 5 down to close to its dew point, is introduced into the bottom of the column 6. The "rich liquid" LR (oxygen-enriched air) from the bottom of this column is, after expansion in an expansion valve 10, introduced at an intermediate point into the column 7. "Upper lean liquid" $LP_1$ (impure nitrogen) withdrawn from an intermediate level of the column 6 is, after expansion in an expansion valve 11, introduced into the top of the column 7. "Upper lean liquid" $LP_2$ (almost pure nitrogen) withdrawn from the top of the column 6 is, after expansion in an expansion valve 12, introduced into the top of the minaret 9.

The oxygen production gas and the nitrogen production gas are withdrawn from the bottom of the column 6 and from the top of the minaret 9, respectively. The waste gas W of the double column, consisting of impure nitrogen, is withdrawn from the top of the column 7. These three gas streams, at close to atmospheric pressure AP, are warmed in the countercurrent exchange line 5 by the incoming air.

The purification apparatus 3 comprises two bottles 13A, 13B, each of which contains a bed 14A, 14B of an adsorbent which is, for example, doped alumina. Each bottle is subjected to the following cycle:

(1) an adsorption phase (a) at the medium pressure MP. The air coming from the chiller 2 is introduced into the inlet (lower end) of the bottle, passes through the bed 14 from the bottom up, emerges, purified, from the outlet of the bottle and is then sent into the exchange line 5;

(2) a purification phase comprising several steps:
a decompression step (b) down to atmospheric pressure;
a countercurrent (i.e. downward) heating/elution step (c) by means of waste gas W coming from the exchange line and then heated to 150° C. by a heater 15. During this step, as illustrated by the dotted lines in FIG. 2, in which the distance along the bottle from its inlet end is plotted on the x-axis while the temperature of the adsorbent is plotted on the y-axis, a heat front moves from the outlet towards the inlet of the bottle (successive times t1 to t5). This step terminates at a predetermined time t2 for which the heat front is entirely contained in the bottle;

a countercurrent cooling/elution step (d) by means of waste gas W coming from the exchange line and introduced into the bottle 13 at the temperature of the hot end of the exchange line, the heater 15 not being involved. This step (d) starts at the aforementioned time t2. During this step, as illustrated by the solid lines in FIG. 2, a cooling front moves from the outlet towards the inlet of the bottle (successive times t3 to t8). This step terminates substantially when, at the time t8, the cooling front reaches the inlet of the bottle and well before the adsorbent lying near this inlet has returned to close to the normal or low adsorption temperature. This time is, for example, determined by a temperature of the emerging elution gas of 70° C.;

(3) a repressurization phase, comprising an initial step (e) in which the pressure rises to the medium pressure, followed by a final safety step (f) at this medium pressure.

In general, the start of steps (b) and (e) takes place by the balancing of the pressures between the two bottles, whereas step (e) continues by introducing the air to be treated into the inlet of the bottle, the outlet of the latter being closed.

When the bottle is returned to the adsorption phase, part of the adsorbent is thus markedly above the normal or low adsorption temperature, which is close to a temperature of the air to be treated, precooled at 2, for example close to the ambient temperature. Consequently, at the start of the adsorption phase, a heat front moves along the bottle as far as its outlet, so that the incoming air cools the entire bed down to the normal adsorption temperature.

Figure 2:
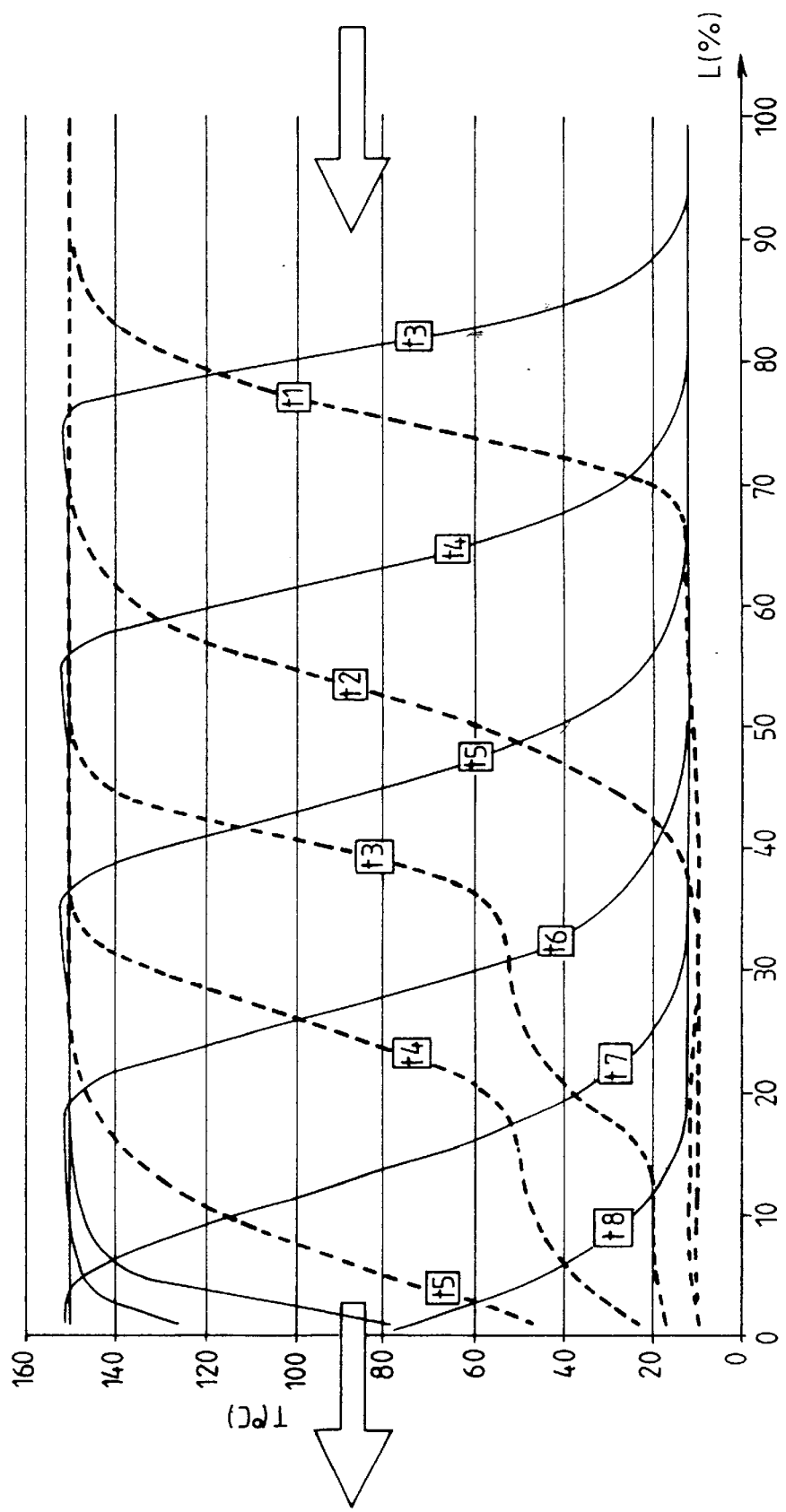
FIG. 2 is a diagram which illustrates the heating/elution and cooling/elution steps according to the invention.
Figure 3:
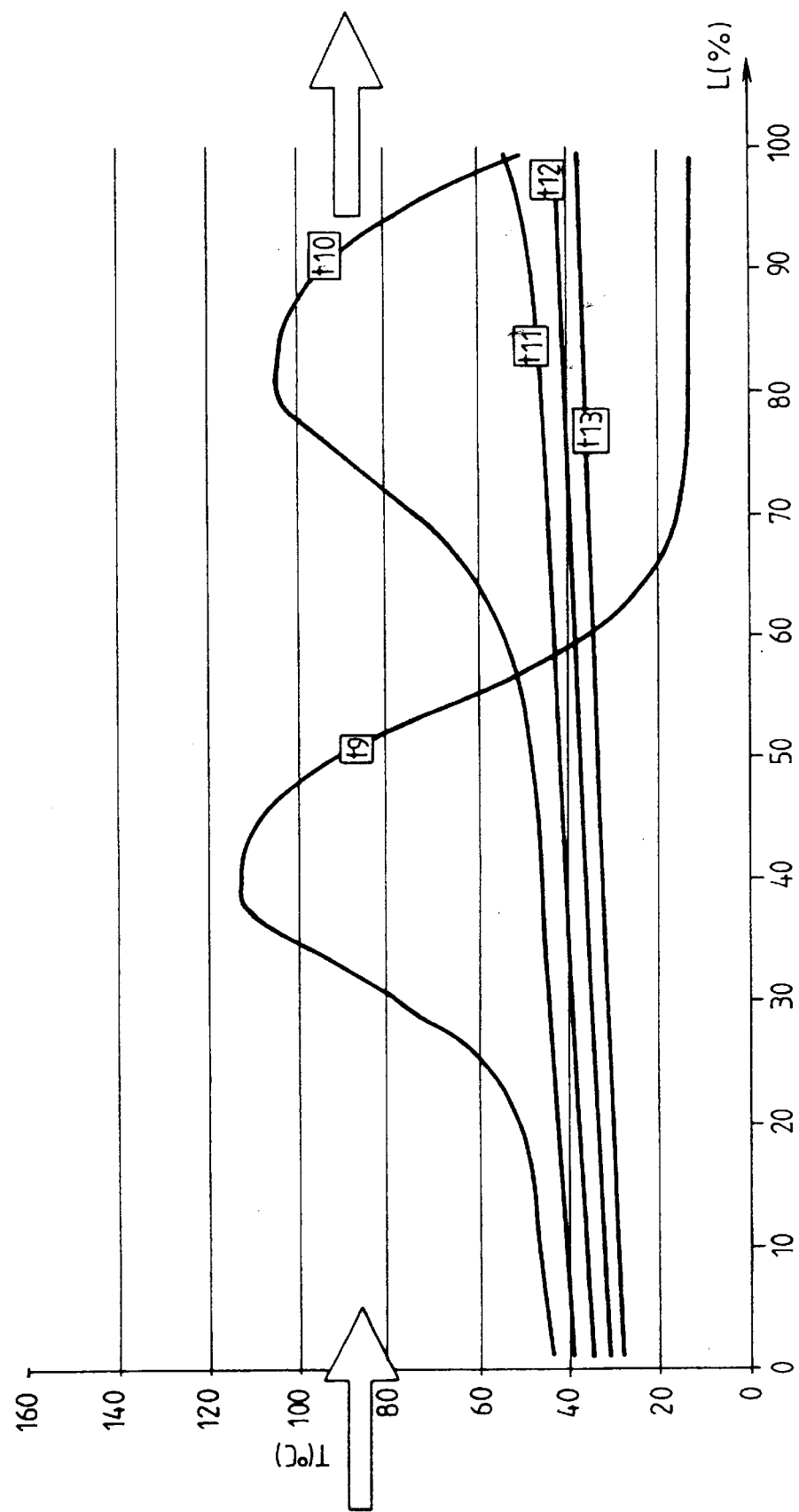
FIG. 3 is a similar diagram to FIG. 2, which illustrates the start of the adsorption phase according to the invention.

This is illustrated in the diagram in FIG. 3, which is similar to that in FIG. 2, for successive times t9 to t13 after the time t8.

The advantages resulting from the process described above will be apparent from the following two examples.

Comparative Example

The absorbent is activated alumina.

The operating conditions are used as follows:

| | |
|---|---|
| Normal adsorption temperature | 19° C. |
| Adsorption pressure | 23 bar |
| Adsorption rate | 15,000 Sm³/h |
| Hot regeneration temperature | 150° C. |
| Regeneration pressure | 1.17 bar |
| Regeneration rate | 2650 Sm³/h |
| End-of-cooling temperature of the adsorbent | 19° C. |

The cooling/elution step (d) is conventionally continued until the adsorbent has been almost completely cooled. At this moment, the elution gas leaves the bottle at close to the low adsorption temperature (19° C. in this example).

Example 1

According to the Invention

The above operating conditions are retained, but step (d) is stopped at a 70° C. outlet temperature of the elution gas. The following comparative table can then be drawn up.

| Step | Comparative example Duration (min) | Example 1 Duration (min) |
|---|---|---|
| (a) Adsorption | 200 | 100 |
| (b) Depressurization | 9 | 9 |
| (c) Heating/elution | 45 | 21 |
| (d) Cooling/elution | 115 | 45 |
| (e) Repressurization | 17 | 11 |
| (f) Safety | 14 | 12 |
| Total Cycle | 400 | 200 |

Thus, the partial cooling of the adsorbent in step (d) results, for a constant elution gas flow rate, in a significant shortening of this step, and therefore of the entire regeneration phase, which determines the duration of the adsorbent phase (a). The latter may be correspondingly reduced, so that the volume of adsorbent is decreased. In turn, this allows the durations of phases (c), (e) and (f) to be shortened.

Overall, it may be seen that it is possible to reduce the cycle time by a half, and therefore a significant saving on the investment can be made.

Figure 4:
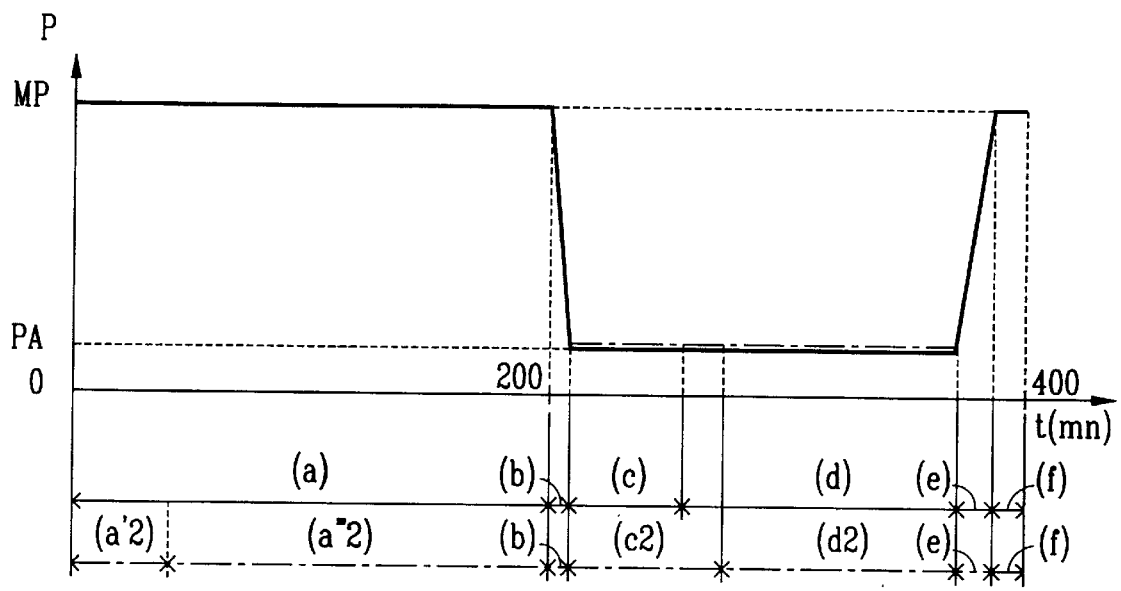
FIGS. 4 and 5 are diagrams which illustrate two embodiments of the invention.
Figure 5:
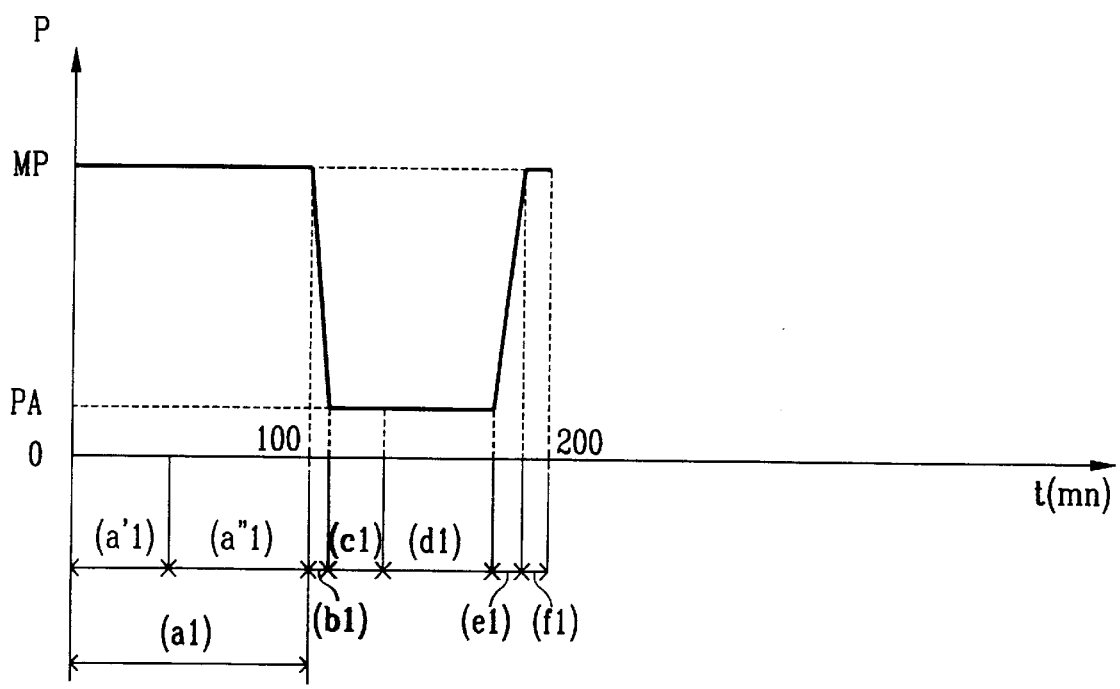

The above results are illustrated by the two curves in solid lines in FIGS. 4 and 5 relating to the Comparative example and to Example 1, respectively. These curves show the variation in the pressure of a bed as a function of time. The cycle of Example 1 thus comprises, in succession: an adsorption phase (a1), which itself comprises an initial adsorption step (a'1) at a relatively high temperature and a final adsorption step (a"1) substantially at the normal low adsorption temperature; a depressurization step (b1) down to atmospheric pressures; a heating/elution step (c1); a partial cooling/elution step (d1); a repressurization step (e1); and a safety step (f1).

FIG. 4 also shows, by the dot-dash lines, an alternative embodiment of the invention, which constitutes Example 2.

In this alternative embodiment, the volume of adsorbent and the durations of steps (a), (b), (e) and (f) of the Comparative Example are retained, as is also the total elution duration (c)+(d).

However, the duration of the cooling/elution step (step (d2)) for partially cooling the adsorbent is reduced from 115 min to 98 min; the heating/elution step (step (c2)) is extended accordingly, from 45 min to 62 min; and the flow rate of the elution gas is correspondingly reduced, from 2650 to 1475 Sm³/h, since the volume of adsorbent has not changed.

As regards the adsorption phase (a), this is subdivided into an initial adsorption step (a'2) at a relatively high temperature and a final adsorption step (a"2) at approximately the normal low adsorption temperature.

This alternative embodiment makes it possible to save a substantial fraction of the elution gas, and therefore to increase the total output of production gas, namely the output of nitrogen in the plant of FIG. 1. In other words, the invention makes it possible, with this alternative embodiment, to increase the productivity of the plant.

Of course, other embodiments of the invention may be envisaged which combine the advantage of reduced investment with the advantage of increased productivity.

The heat front which passes through the bed at the start of the adsorption phase, illustrated in FIG. 3, moves more rapidly than the incoming air. Consequently, steps (a'1) and (a'2) are short and the adsorbent rapidly reaches a temperature close to its normal adsorption temperature, so that the performance of the adsorbent is hardly affected by the partial cooling described above.

If it is desired to reduce the heat peak sent into the cold box (essentially consisting of the double column 4 and the exchange line 5) when passing into the adsorption phase, a short time interval may be provided during which the two bottles 13A and 13B are in adsorption mode at the same time, and the two production gas streams (purified air) are combined before being sent into the exchange line, as illustrated by the dotted lines in FIG. 1.

What is claimed is:

1. Process for the treatment of a gas by Temperature Swing Adsorption (TSA) in at least two beds of adsorbent, in which each bed of adsorbent is subjected to a cycle which comprises, in succession: an adsorption phase, which itself comprises an adsorption step at a low adsorption temperature; an adsorbent regeneration phase, which itself comprises a depressurization step; a heating/elution step, during which the bed is purged with a hot heating/elution gas, and a cooling/elution step, during which the bed is purged with a cold cooling/elution gas; and a repressurization phase, in which:

(a) the cooling/elution step is terminated while the cooling/elution gas leaving the bed is at a temperature of at least 30° C. greater than the temperature of the gas to be treated;

(b) the adsorption phase comprises an initial adsorption step, during which the bed is cooled down to the low adsorption temperature due to the effect of the gas to be treated;

(c) and wherein, during at least a first part of the initial adsorption step, the bed is connected up in parallel with another bed at the end of the adsorption phase, and the two gas streams coming from these two beds are combined.

2. The process according to claim 1, wherein the cooling/elution step is terminated when the cooling/elution gas leaving the bed is at a temperature of at least 50° C. greater than the temperature of the gas to be treated.

3. The process according to claim 1, wherein the gas to be treated is atmospheric air intended to be distilled.

4. The process according to claim 3, wherein the cooling/elution step is terminated when the cooling/elution gas leaving the bed is at a temperature of about 70° C.

5. The process according to claim 4, wherein the duration of a total adsorption/regeneration cycle does not exceed 200 minutes.

6. The process according to claim 3, wherein the duration of a total adsorption/regeneration cycle does not exceed 200 minutes.

7. A process for the treatment of a gas by Temperature Swing Adsorption (TSA) in at least two beds of adsorbent, wherein each bed of adsorbent is subjected to a cycle which comprises, in succession: an adsorption phase for producing a product gas, including an adsorption step at a low adsorption temperature; an adsorbent regeneration phase, including a depressurization step, a heating/elution step, during which the bed is purged with a hot heating/elution gas, and a cooling/elution step during which the bed is purged with a cold cooling/elution gas; and a repressurization phase, wherein:

(a) the cooling/elution step is terminated while the cooling/elution gas leaving the bed is at a markedly higher temperature than the temperature of the gas to be treated;

(b) the adsorption phase comprises an initial adsorption step during which the bed is cooled down to the low adsorption temperature as a result of the admission of the gas to be treated; and wherein (c) during at least a first part of said initial adsorption step, the bed is connected up in parallel with another bed at the end of the adsorption phase, and the two gas streams exiting from these two beds are combined in a common flow of product gas.

8. The process according to claim 7, wherein the gas to be treated is ambient air and the product gas is sent as a feed gas to a cryogenic air separation unit.

\* \* \* \* \*